United States Patent
Wheatley et al.

(10) Patent No.: US 6,247,146 B1
(45) Date of Patent: Jun. 12, 2001

(54) METHOD FOR VERIFYING BRANCH TRACE HISTORY BUFFER INFORMATION

(75) Inventors: Travis Wheatley; Michael Wisor; Christopher Gray, all of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/135,065

(22) Filed: Aug. 17, 1998

(51) Int. Cl.$^7$ ........................................ G06F 11/00
(52) U.S. Cl. ........................ 714/38; 714/45; 712/236
(58) Field of Search .................... 712/227, 239, 712/216, 240, 38, 45, 236

(56) References Cited

U.S. PATENT DOCUMENTS

| | | | |
|---|---|---|---|
| 5,752,014 | * 5/1998 | Mallick et al. | 712/239 |
| 5,784,604 | 7/1998 | Muhich et al. | 712/238 |
| 5,805,877 | * 9/1998 | Black et al. | 712/239 |
| 5,864,697 | * 1/1999 | Shiell | 712/240 |
| 5,978,902 | * 11/1999 | Mann | 712/227 |
| 6,009,270 | 12/1999 | Mann | 395/704 |
| 6,081,887 | * 6/2000 | Steely, Jr. et al. | 712/239 |
| 6,088,793 | * 7/2000 | Liu et al. | 712/239 |
| 6,094,729 | 7/2000 | Mann | 714/25 |
| 6,112,293 | * 8/2000 | Witt | 712/216 |

\* cited by examiner

*Primary Examiner*—Zarni Maung
*Assistant Examiner*—Jungwon Chang
(74) *Attorney, Agent, or Firm*—Conley, Rose & Tayon, PC; B. Noël Kivlin

(57) ABSTRACT

A method and system for verifying the accuracy of trace data generated by execution of a program on a computer under test, one embodiment of the method comprising scanning the trace data to locate bitmap data corresponding to series of consecutive conditional branches and comparing the number of bits representative of these branches to the number of consecutive conditional branches in the instruction sequence. The trace data includes address entries and bitmap entries. The trace data is scanned in reverse chronological order beginning with the most recent entry to locate an address entry preceding one or more bitmaps which represent a most recent series of conditional branches. Beginning with the instruction at the address contained in the address entry, the program instructions are scanned in program order until a conditional branch is encountered. The branch is counted and the trace data is examined to determine whether the branch was taken and scanning is resumed. The scanning and counting of the conditional branches continues until an instruction which generates a non-bitmap entry is encountered. The number of conditional branches is then compared to the number of bits representative of branches to verify that they are equal. In some embodiments, the target addresses of the branch instructions are also checked to verify that they correspond to the target addresses of the corresponding BTHB entries. Preceding bitmap entries are each checked in this manner until all of the trace data has been verified.

22 Claims, 4 Drawing Sheets

METHOD FOR VERIFYING BRANCH TRACE HISTORY BUFFER INFORMATION

CROSS-REFERENCE TO RELATED APPLICATION

This application relates to application, Ser. No. 09/135,493, now U.S. Pat. No. 6,173,395, filed on the same day as the present application and entitled "MECHANISM TO DETERMINE ACTUAL CODE EXECUTION FLOW IN A COMPUTER SYSTEM" by Michael Wisor, Travis Wheatley and Dan S. Mudgett, which is incorporated herein by reference.

BACKGROUND OF THE INVENTION

1. Field of the Invention

The invention relates generally to means for testing microprocessors and more specifically to devices and methods for recording significant trace events in the execution of a software program in a trace history buffer and then using the trace history buffer to reconstruct the sequence of execution of the program's instructions.

2. Description of the Relevant Art

There are numerous problems involved in the development of integrated circuits (ICs) and devices which use ICs. Because of the increasing speed and complexity, as well as the decreasing size of ICs, designers face decreased access to the products for testing and increased amounts of time to perform the tests. It is becoming more and more difficult to test and debug the design and operation of these products but, when a new processor design is implemented, it must be debugged to ensure that it operates as expected. (Debugging is the process of finding and eliminating problems, or bugs, in hardware or software.)

Many of the designers' problems arise from the difficulty of using traditional testing at the IC level, board level and system level. The complexity of testing using traditional methods has grown commensurately with the complexity of the products themselves. For example, a large portion of the time required to implement a new microprocessor design is spent on debugging the design. The increased costs and the time required to debug and test can cause delays which disrupt manufacturing flows and hinder manufacturers' efforts to bring the products to market. Testing methods which can offset the complexity of the products are therefore desirable.

The time and expense associated with traditional testing methods have lead to the development of what are known as "design for test" methods. Design for test (DFT) methods actually comprise both design methodologies and testing methodologies. DFT methodologies incorporate certain design rules and techniques and also include implementation of specific test-related structures to allow for greater ease of testing. DFT methodologies may be implemented at IC, board and system levels. The facilitation of testing through DFT methodologies allows thorough testing of products which might otherwise be prohibitively expensive or time consuming. The use of DFT methodologies, although increasing the length of the design cycle and the cost of designing the products, results in overall time and cost savings because of improved capability to debug, test and maintain the products.

Individual manufacturers' implementations of embedded test circuitry have varied. Some manufacturers have chosen to use proprietary techniques and structures. The use of individualized and restricted implementations, of course, may be limited. In order to allow DFT methodologies to be more widely utilized and more efficient, some manufacturers have attempted to develop standards relating to DFT methodologies in order to allow the use of less specialized, less costly equipment and greater reuse of previously developed test data.

DFT methodologies can be used in conjunction with more traditional test methods and tools. Debugging tools may therefore be external to the processor, internal to the processor, or a combination of both. The external tools may include software debuggers and hardware tools such as logic analyzers. The inclusion of internal debug features, or even more general features which simply facilitate debugging within a processor, can be very helpful to the designer and manufacturer of the processor. They can also be helpful to developers of hardware and software which will be used in connection with the processor.

One method for debugging a microprocessor is to execute a known application or a simple piece of test code on the microprocessor and then observe the results to determine whether the code executed correctly. The results which should be produced by the test code are known. The code is executed and the results are compared to the anticipated results. If the test code produces a correct result, the microprocessor is assumed to have operated properly. Any incorrect or inconsistent results indicate that the microprocessor has functioned in error.

When execution of the test code produces an incorrect output, this output may result from improper execution of any one of the instructions in the code. It is therefore useful to be able to observe execution of each of the instructions or to trace the sequence of instruction which is executed. By observing the execution of each instruction, it can be determined whether the test code executed in the expected manner or whether, for example, the code took a branch which should not have been taken. The identification of these branches which are taken in error can help the designer determine the design error which lead to the taking of the branch.

Some prior art debugging applications allow the user to track execution of a piece of test code. These debugging applications typically execute the test code line by line and display information related to the instructions so that the user can track the execution of the test code. The applications may also display particular information about the system as each instruction is executed. For example, the application may show the contents of various registers to the user. Using these applications, a user can determine the sequence of instructions which were executed in the test code and can thereby determine whether the microprocessor is functioning as intended.

Prior art debugging applications can be stopped at selected points in the execution of the code by setting breakpoints or by allowing a certain number of instructions to be executed. The user may thereby be able to step through the test code, one instruction at a time. One of the problems with this type of debugging is that the application cannot back up to a previously executed instruction. That is, it cannot undo one or more previous instructions. If the user wishes to determine the exact sequence of instructions which led to the current point in the test code's execution, the user must re-execute the test code until it reaches the point of interest. This re-execution of the test code can result in wasted time and processing bandwidth, particularly if the test code is large or if it requires a great deal of time to execute.

SUMMARY OF THE INVENTION

These and other problems in the prior art are in large part solved by the present invention. The invention utilizes a branch trace history buffer (BTHB) to enable the user to trace the sequence of execution of instructions in the test code. The microprocessor is configured to store entries corresponding to the execution of control instructions and other significant trace events in a BTHB. ("Trace events" are instructions for which information is stored in the BTHB.) Conditional branch information is stored in bit maps in the BTHB, while entries for most other trace events are stored as logical addresses. Non-control instructions are not recorded in the BTHB. After execution of the test code, the contents of the BTHB are retrieved and compared to the test code. The BTHB contents are parsed and the number of conditional branches represented by the bitmaps in the BTHB are compared to the number of conditional branches in the code to verify that the BTHB is consistent with the code.

When a test program is executed, a trace record is generated and stored in the BTHB. The trace record consists of full entries and bitmap entries. The full entries are generated for unconditional branches and other significant trace events. ("Full" entries, as used herein, are those entries which each correspond to a single branch or trace event.) The full entries contain information relating to the target addresses of the branches. The bitmap entries are generated for a series of conditional branches and contain individual bits which represent the taken or not-taken status of the branches.

In one embodiment, the BTHB contents are scanned in reverse chronological order to find sections consisting of an unconditional branch entry, one or more bitmap entries and another unconditional branch entry. The first of the unconditional branch entries includes a target address. The test code is scanned from this address forward. When a conditional branch is encountered, the branch is counted and then taken or not taken according to the corresponding bit of the corresponding bitmap entry. The code is scanned in this manner until the next unconditional branch is encountered. When this branch is reached, the total number of conditional branches encountered can be compared to the number of branches represented by the bitmap entries. If the numbers match, the section of the BTHB contents consisting of the two unconditional branch entries and the intervening bitmap entries are verified. If the numbers do not match, the entries are inaccurate. In one embodiment, the unconditional branches following the bitmaps are checked against the corresponding entries in the BTHB to determine whether the branch target is the same as the target address in the BTHB entry.

When one section of the BTHB has been verified, the BTHB is again scanned to locate the preceding unconditional branch-bitmap-unconditional branch section. This section is verified in the same manner described above, and the process is repeated until the entire BTHB has been verified. This verification of the BTHB contents against the program code helps the user avoid applying the branch information to portions of the code to which it does not correspond and thereby prevents erroneous interpretation of the code flow of the program.

BRIEF DESCRIPTION OF THE DRAWINGS

Other objects and advantages of the invention will become apparent upon reading the following detailed description and upon reference to the accompanying drawings in which.

Figure 1:
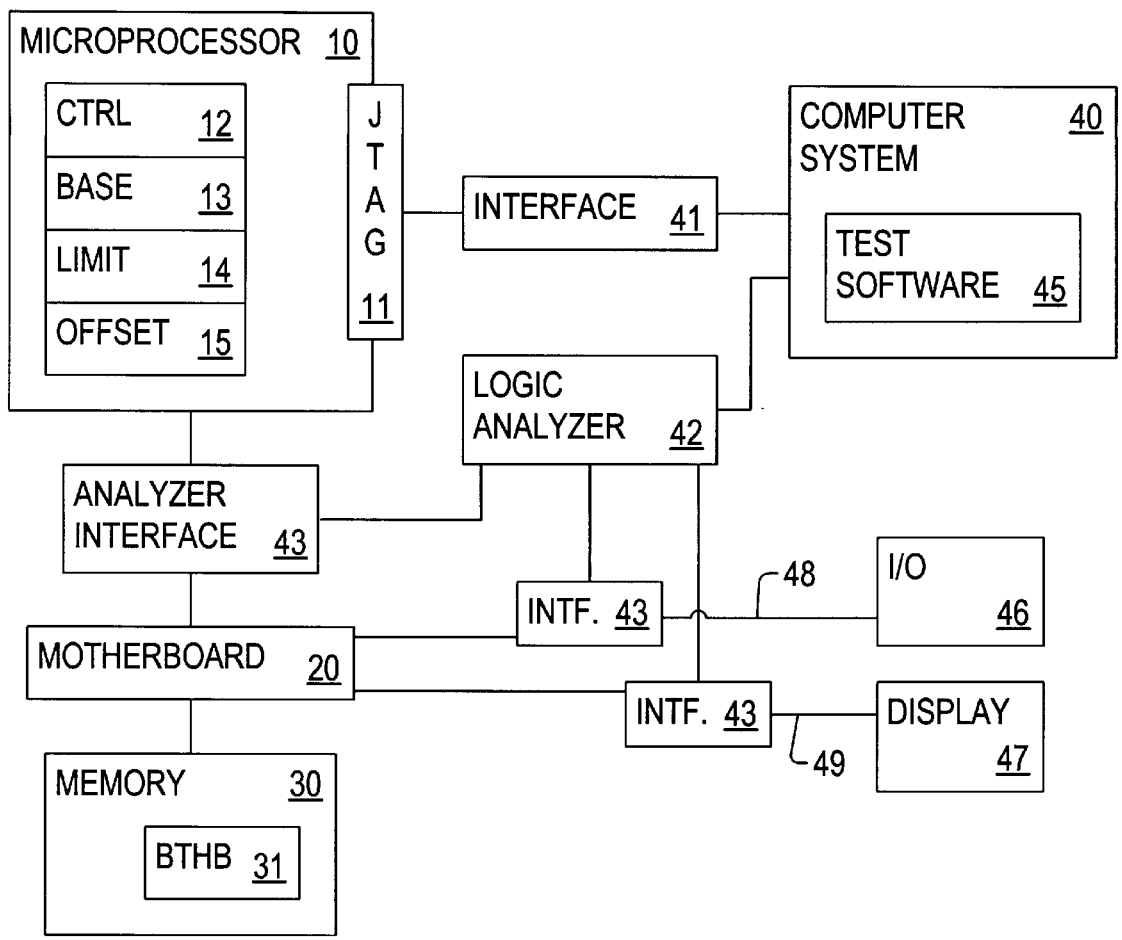
FIG. 1 is a block diagram illustrating the setup of a microprocessor implementing a BTHB and the associated test hardware.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention will be described in detail below. This embodiment utilizes a BTHB to store data relating to the execution of particular instructions in the code of a test program. The stored data identifies whether or not certain branches in the test program were taken and provides address information on other significant trace events. Jumps, calls, returns and other trace events which cause execution to resume with an instruction other than the next instruction in program order are considered branch instructions for the purpose of this disclosure. Changes to the global descriptor table register, the local descriptor table register, the interrupt descriptor table register or the system control register CR3 are trace events which generate entries in the BTHB, but do not cause a branch to an instruction other than the next instruction in program order. The information stored in the BTHB is sufficient to determine the sequence of instructions executed in the test program.

Referring to FIG. 1, the setup of a microprocessor implementing a BTHB and the associated test hardware is shown. Microprocessor 10 is part of the system under test. Microprocessor 10 includes BTHB-related registers 12–15. BTHB control register 12 contains data relating to the tracing of data and recording of entries in the BTHB. Base register 13 contains the starting address of the BTHB and limit register 14 contains the ending address of the BTHB. Offset register 15 contains the address of the next entry in the BTHB and always has a value between those of the base and limit registers 13 and 14. Microprocessor 10 is coupled to motherboard 20 via one of the logic analyzer interfaces 43. Additional interfaces 43 are coupled to I/O devices 46 via PCI bus 48 and display devices 47 via AGP bus 49. Logic analyzer 42 need not be used, but it allows the user to obtain bus information which will enable additional analysis of the system. Memory 30 is coupled to motherboard 20. BTHB 31 is allocated within memory 30 and is accessed by microprocessor 10 in the same manner as the remainder of memory 30.

The test hardware, or test station, includes computer system 40 and interface hardware 41, which couples computer system 40 to microprocessor 10. Interface hardware 41 is coupled to microprocessor 10 at test port 11. In one embodiment, test port 11 is configured according to IEEE Standard 1149.1-1990, IEEE Standard Test Access Port And Boundary Scan Architecture in order to provide means for instructions and data to be directly read into and out of microprocessor 10 by computer system 40. Interface hardware 41 accordingly uses the IEEE 1149.1 protocol to communicate via port 11. Interface hardware 41 communicates with computer system 40 via parallel port, USB or such other protocol as is suitable for the particular system. (Because interface hardware 41 essentially translates a set of input signals to corresponding output signals, it may not be required in some embodiments in which the signals do not need to be altered.) Computer system 40 may be a personal computer or a system specifically adapted to the microprocessor test setup. In one embodiment, computer system 40 is coupled to logic analyzer 42. Logic analyzer 42 is used to capture memory, input/out (I/O) and memory mapped I/O from microprocessor 10 for use by computer system 40. A memory image can also be extracted from microprocessor 10 via JTAG port 11. Test software 45 is executed by computer system 40 and controls its functionality.

Microprocessor 10 is configured to execute a program, detect significant trace events, and record entries in BTHB 31 for those events. Computer system 40 has control over the recording of the trace events to the extent that it sets the values of the various fields in control register 12. Microprocessor 10 records the trace events according to the settings of control register 12, but does not require any active support from computer system 40. After microprocessor 10 completes execution of the program (or as much of the program as the user wishes to trace,) BTHB 31 contains entries corresponding to the traced portion of the program. The BTHB entries (and memory contents, if desired) can be retrieved by computer system 40 and analyzed. Microprocessor 10, with motherboard 20, memory 30 and the remainder of the system under test, may be removed from the test setup, as they are not necessary for the analysis of the trace data. Other testing can therefore be conducted in parallel with the trace analysis.

The program instructions executed by a microprocessor can be broken up into sets of instructions called basic blocks. A basic block is a sequence of instructions which have the property that, if the first instruction in the basic block is executed, each of the instructions in the basic block will be executed. Basic blocks end with a branch instruction. When tracing execution of a program, it is not necessary to record every instruction in a basic block because execution of one instruction in the block indicates execution of all the instructions in the block. Tracing execution of the program therefore only requires that it be determined which branch is taken and its target address at the end of each basic block. The target address indicates the start of the next basic block to be executed.

The tracing of a test program using the BTHB facility of the microprocessor thus involves detecting the branch instructions and recording information regarding the branch which will allow the instruction executed immediately after the branch to be identified. The information is stored as an entry in the BTHB. The format of a BTHB entry in one embodiment of the invention is illustrated in FIG. 2.

Figure 2:
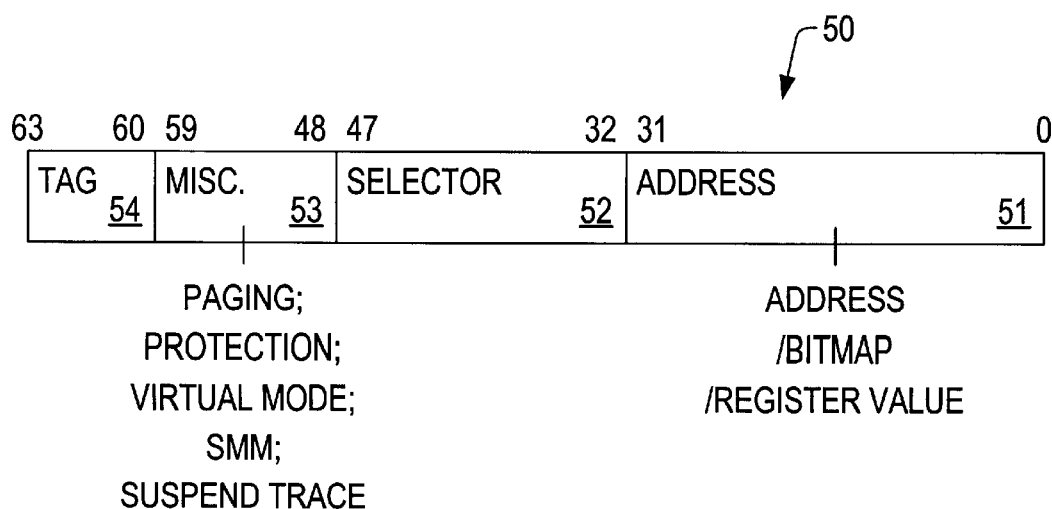
FIG. 2 is a diagram illustrating the format of a BTHB entry in one embodiment of the invention.

FIG. 2 shows that each BTHB entry 50 comprises 64 bits. The high-order 4 bits (63:60) are a tag 54 which identifies the type of branch or event which corresponds to the entry. For example, a hexadecimal 0 may indicate a synchronization entry, while a hexadecimal 2 may indicate a jump or a call. The low order 32 bits (31:0) are used as an address field 51 for unconditional branches. Although this field is referred to as an address field, it can be used to identify the logical address of the next sequential instruction (or target instruction), to store a value entered in one of the microprocessor registers, or to represent a sequence of conditional branches which are taken or not taken, depending on the type of BTHB entry. If a series of conditional branches is indicated, the next higher 16 bits (47:32) are not used. If the low order 32 bits indicate a logical address, the next higher 16 bits identify a selector 52 for the code segment in which the target address is located. (The logical address consists of the selector and an offset which is specified in the low-order 32 bits.) The remaining bits (59:48) are used for other information 53, such as whether paging or protection are enabled, whether virtual or SMM modes are enabled, what the default operating mode is and whether tracing should be suspended on recording of the entry. This remaining information is referred to herein as "miscellaneous" entry information.

In the case of unconditional branches, such as jumps, calls and returns, address field 51 of the BTHB entry contains a target address and selector field 52 contains the code segment selector for the target address. In one embodiment, the target code segment selector is included in the entry if the target address is in a code segment other than the currently executing segment. Unconditional jumps whose target addresses are dependent only upon the contents of the current code segment do not require a trace entry at all. The fact that these unconditional jumps do not cause BTHB entries to be written has a significant impact on the size of the BTHB. This not only eliminates these entries, but also prevents some unfilled bitmap entries from being written to the BTHB.

In the case of conditional branches, the instructions immediately following each branch can be identified simply by an indication of whether or not the branch was taken. Conditional branches can therefore be represented by a one-bit record. Since conditional branches can be represented in this manner, it would be inefficient to store information on these branches in the same way as unconditional branches. Conditional branch information is therefore compressed and represented as a bitmap. That is, a series of consecutive conditional branches is represented as a series of consecutive bits in a single entry in the BTHB. Because the vast majority of the branches encountered in a program are conditional branches, the representation of these branches with a single bit per branch greatly reduces the amount of storage space required for the trace information as compared to trace mechanisms which record full-length entries for each of the branches.

One embodiment of the invention uses a 32-bit bitmap to record conditional branch information. The bitmap is filled from the highest order bit to the lowest. The 32 bits of the bitmap occupy address field 51 of the BTHB entry (the low order 32 bits of the 64-bit entry.) The 16 bits of selector field 52 are not used in bitmap entries. The bitmap entries do, however, include tag information 54 to identify them as bitmap entries, and they include the same miscellaneous information 53 as the other entries.

Since the number of consecutive conditional branches encountered in a program most likely will not exactly match the number of bits in the bitmap, bitmap entries each include a stop bit (in this case a 1) after the last bit which corresponds to an encountered branch. All the bits which follow the stop bit are 0's. Thus, a single bitmap entry can record data for up to 31 conditional branches.

When a conditional branch is encountered in the test program following an unconditional branch or other event which causes a BTHB entry to be recorded, a new bitmap is started. As consecutive conditional branches are encountered, a bit is set in the bitmap for each of these branches. If another unconditional branch or trace event occurs before the bitmap is filled, a stop bit is entered in the bitmap and the bitmap entry is recorded in the BTHB. An entry for the unconditional branch or trace event is then recorded in the BTHB. If a bitmap is filled before another unconditional branch or trace event is encountered in the program, the bitmap entry is recorded in the BTHB. A subsequent conditional branch will cause a new bitmap to be started.

Figure 3:
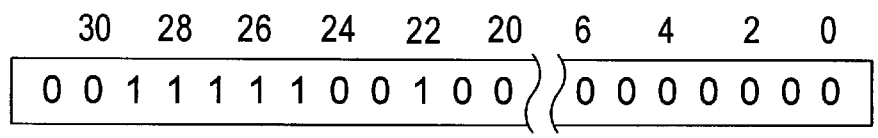
FIG. 3 is an example of a bitmap as used in this embodiment of the invention.

FIG. 3 shows an example of a bitmap as used in this embodiment of the invention. In the figure, bits 0 through 21 are 0's. Bit 22 is the lowest order 1 and can therefore be identified as the stop bit. Since bit 22 is the stop bit, each of bits 23 through 31 must correspond to a conditional branch. In this example, 1's represent taken branches and 0's represent not-taken branches. It can therefore be determined from the bitmap that the first two branches were not taken, the next five were taken, and the next two were not taken. After the last of these conditional branches, a trace event other than a conditional branch occurred, causing the stop bit to be inserted in the bitmap and causing the bitmap to be written to the BTHB.

Since conditional branches are so much more prevalent than other types of trace events, it is possible that a large number of bitmap entries could be generated. This could present a problem because there needs to be an unconditional branch record in the BTHB in order to enable verification of the BTHB data against the program code based on the trace information. As a result, one embodiment automatically generates and records a synchronization entry in the BTHB if fifteen consecutive bitmap entries are recorded without any intervening unconditional branch entries.

As noted above, significant trace events other than conditional and unconditional branches are recorded in the BTHB. One type of significant trace event is a change to one of the address-related registers. More particularly, changes to the global descriptor table register (GDTR), the local descriptor table register (LDTR), the interrupt descriptor table register (IDTR) or the system control register CR3 will cause a BTHB entry to be written. Changes to these registers result in BTHB entries because they control the segmentation and paging mechanisms. It is important to record these trace events because they affect the interpretation of the other entries in the BTHB.

For example, in an x86 architecture, a BTHB entry for a particular jump includes an address and a code segment selector. Because the code segment selector is indexed into a global descriptor table identified by the GDTR, a change to the GDTR represents a change in the global descriptor table and a corresponding change in memory addressing. Therefore, in order to properly interpret the addresses recorded in the BTHB, it is necessary to know whether the basis for the addresses in the segmentation and paging mechanisms has changed since the corresponding entries were recorded. BTHB entries for changes to the GDTR, LDTR, IDTR and CR3 registers contain the newly stored data values in address field 51 instead of an instruction address. Other types of events for which entries are recorded in the BTHB include interrupts and exceptions. BTHB entries for these events can include target addresses and interrupt vectors In one embodiment, the recording of information in the BTHB is based on data stored in a control register. The information in the control register defines various parameters of the operation of the BTHB. The control register governs when tracing is started and stopped, which code is traced, which privilege levels are traced, what happens when the BTHB is filled, and so on. Tracing can be set to start immediately or upon reaching one of the breakpoints in the test program. Tracing can be set to stop upon reaching a breakpoint or when the BTHB is full. The buffer can be set to wrap around so that the oldest entries are overwritten by the newest entries, or it can be set to generate an interrupt. Various other options may also be set via the fields of the control register.

Figure 4:
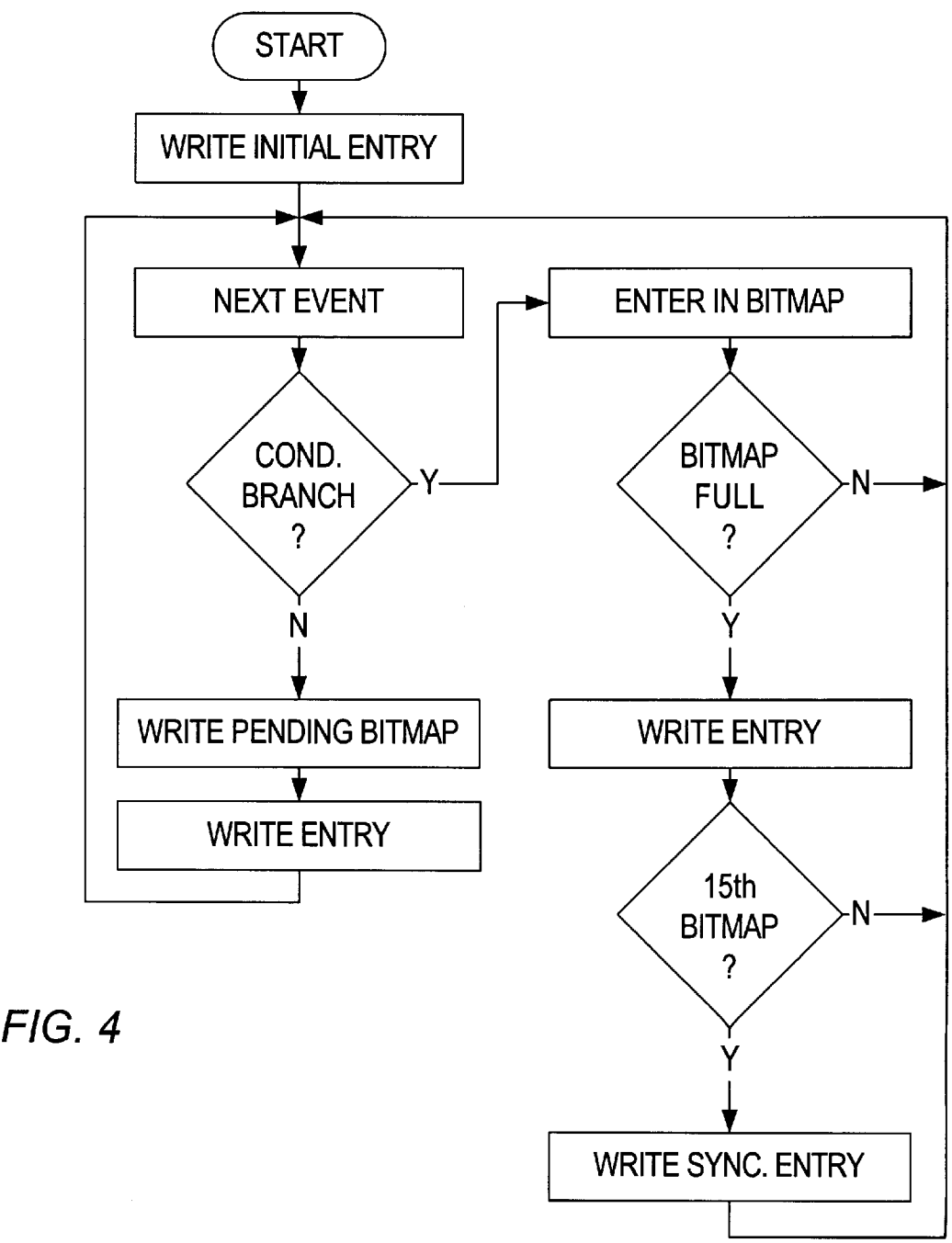
FIG. 4 is a flow diagram illustrating the generation of entries in the BTHB.

When the tracing facility is turned on, the microprocessor automatically stores an initial entry in the BTHB. This initial entry is necessary because reconstruction of the trace from the information in the BTHB requires an address for the first instruction in the traced code. In order to allow the trace to be started at an arbitrary point in the code, the BTHB facility must provide an initial entry with an initial address. After the recording of the initial entry, the microprocessor begins recording entries as described above for the conditional and unconditional branches and the other significant trace events encountered during execution of the test program. For the purposes of this discussion, the initial entry can be treated as an unconditional branch entry. A flow diagram illustrating the generation of the BTHB entries is shown in FIG. 4.

In one embodiment, the BTHB is a circular buffer. The entries can therefore wrap around if the buffer is full (or tracing may be stopped when the buffer is full, depending on the data stored in the control register.) The location of the BTHB is stored in a base register and its size is determined by the difference between the base register and a limit register (the limit register stores the address which is the upper limit of the buffer.) In one embodiment, the size of the BTHB is constrained to multiples of 4k bytes. The location of the next entry in the BTHB is determined by adding the contents of the base register with the contents of an offset register.

The BTHB registers are initialized by a debug program according to the user's needs. (As described above, the test station and debug program are interfaced to the system under test via a JTAG port in the microprocessor.) A program is then executed on the test microprocessor. As a result of the program's execution, data may be stored in memory and entries are recorded in the BTHB. The user can reconstruct the sequence of assembly code instructions which were executed by the program using the BTHB entries and memory data. In alternate embodiments, a program listing in a high level language (e.g., C++) may be used to reconstruct the sequence of instructions in that language.

After a program is executed on the system under test, the contents of the BTHB are retrieved into the computer system of the test station. In addition to the BTHB contents, the computer system retrieves an indication of which is the last entry in the BTHB. Likewise, the computer system receives an indication of which is the last instruction to be executed during the trace. Beginning with the last instruction and the last trace entry, the BTHB contents are checked to determine whether the number of bits in the bitmaps between consecutive full BTHB entries matches the corresponding number of conditional branches in the instruction sequence. If the numbers match, the BTHB entries are assumed to accurately reflect the code flow of the program. If the numbers do not match, then the BTHB does not accurately reflect the code flow and can be disregarded by the user.

Figure 5:
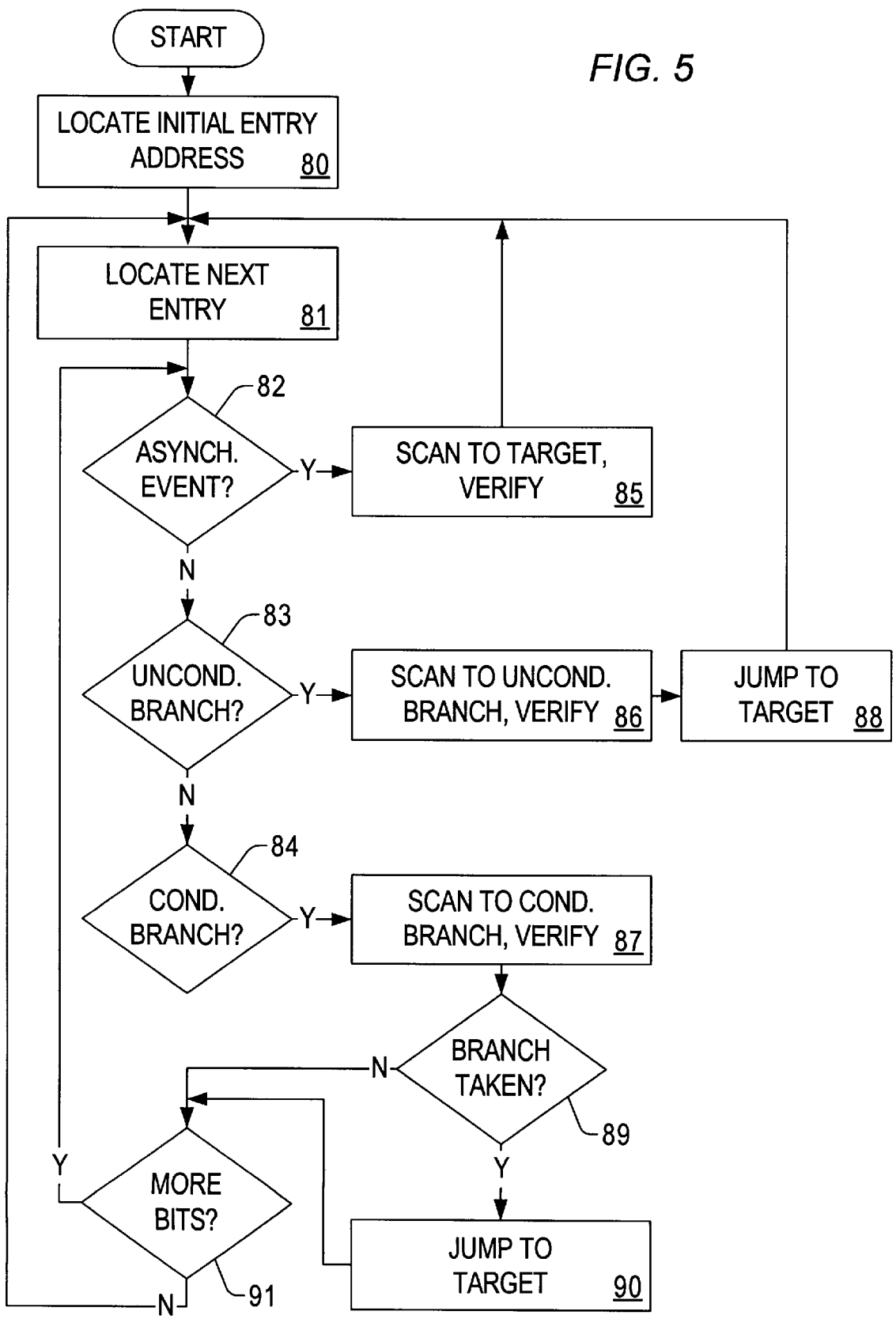
FIG. 5 is a flow diagram illustrating the top-down verification of the traced code in one embodiment of the invention.

In one embodiment, the BTHB is verified in a top-down fashion. The algorithm for this embodiment is illustrated in the flow diagram of FIG. 5. In this embodiment, the traced code is scanned in execution order. ("Execution order" as used herein means the order of instructions as they are executed. "Program order" as used herein means the order of the instructions as shown in a program listing.) The computer system locates the initial entry in the BTHB and determines the starting point in the code (the initial instruction) from this entry 80. The next BTHB entry is then checked to determine what type of trace event caused the entry to be generated 81. If the entry corresponds to an asynchronous event 82, such as an interrupt, the computer system scans the code in program order from the starting point to the target specified in the entry and verifies that none of the scanned instructions would have generated an intervening BTHB entry 85. If the entry corresponds to an unconditional branch instruction 83, the computer system scans the code until an unconditional branch is located 86. Again, the system verifies that there are no instructions which would have generated an intervening BTHB entry. If the entry corresponds to a series of conditional branches (i.e., it is a bitmap entry) 84, the computer system scans the code in program order until a conditional branch is located, verifying that there are no instructions which would have generated an intervening BTHB entry 87.

If the entry corresponds to an asynchronous event or an unconditional branch, the system then checks the next BTHB entry 81 and continues, using the target address is specified in the last entry as the starting point in the code 85, 88. If the entry corresponds to a conditional branch, the system checks either the next bit in the bitmap (if there are bits corresponding to additional conditional branches) or the next BTHB entry (if there are no additional bits corresponding to conditional branches) to determine whether the branch was taken 89. The system then jumps to the target of the conditional branch 90 (if the corresponding bit indicates that the branch was taken) or simply moves to the next instruction in program order (if the bit indicates the branch was not taken) and continues, using this instruction as the starting point. If there are no additional significant bits in the bitmap of the BTHB entry, the next BTHB entry is located 81. Otherwise, the same BTHB entry is used, but the next bit in the bitmap is checked to determine whether the next conditional branch was taken. This process is repeated until all of the BTHB entries have been verified. If any intervening instructions are found, the BTHB contents are not an accurate record of the trace history. It should be noted that the top-down verification of the BTHB contents can be used only when it can be guaranteed that the memory system will not affect the address translation of the target addresses stored in the BTHB entries.

Figure 6:
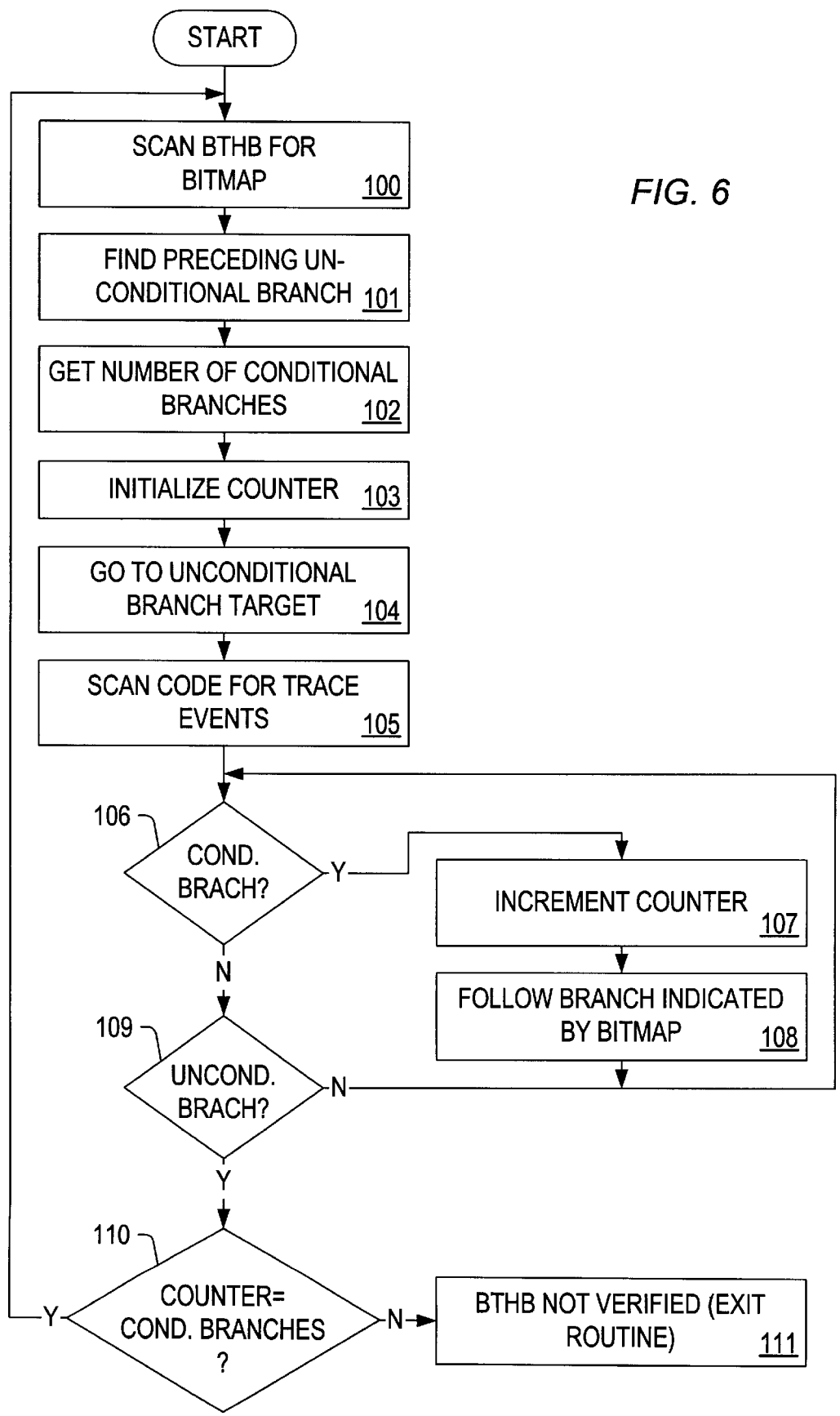
FIG. 6 is a flow diagram illustrating the verification of a section of the traced code in an alternate embodiment of the invention.

In an alternate embodiment, the BTHB is checked against the program code one section at a time to verify that its contents are consistent with the code. The algorithm used in this embodiment to check one section of code against the BTHB contents is illustrated in FIG. 6. The figure shows the verification of the last section (in execution order) of the traced code. The last section of code traced is therefore the first to be checked. Beginning with the last entry in the BTHB, the computer system scans through the BTHB entries in reverse order until a bitmap entry is found 100. This entry may be one of several consecutive bitmaps. The computer system then finds the unconditional branch entry which immediately precedes the bitmap entries 101. The computer system then determines how many conditional branches are represented by the bitmaps 102. A counter is then initialized 103. This counter will be used to store the number of conditional branches encountered in following the flow of the code as described below.

The entry for the unconditional branch includes a target address for an instruction which follows the unconditional branch. The computer system starts with this instruction 104 and follows the sequence of instructions in program order, determining whether each one would generate a trace entry 105 and, if so, what type of entry would be generated. When a conditional branch is found 106, a counter is incremented 107 and the branch is taken or not taken, as indicated by the corresponding bit in the corresponding bitmap entry 108. The computer system then proceeds to find the next entry-generating instruction 105. If an unconditional branch is encountered 109, the total number of conditional branches in that section of code is known. This number is compared to the number of conditional branches represented by the bitmaps 110. If the numbers match, the BTHB data is assumed to be accurate and the verification process continues 100 with another section of code corresponding to a preceding set of bitmap data. If the numbers do not match, the BTHB data does not accurately reflect the sequence of execution of the instructions and the BTHB is disregarded 111.

When a section of the BTHB data has been verified, a preceding section (one or more bitmap entries between unconditional branch entries) is selected for verification. The new section is selected by again scanning the BTHB entries in reverse chronological order to find a new set of bitmap entries and a preceding unconditional branch entry. The same procedure described above is used to verify each section until the initial entry of the trace is reached.

An alternate embodiment may use entries other than unconditional branch entries to define the boundaries of a section in the BTHB. Since an address is needed to establish a starting point for the verification algorithm, the entries used should be those which include an instruction address. For example, in one embodiment, an entry for a system management interrupt includes the address of the next sequential instruction to be executed following the interrupt. This entry could therefore be used to establish an initial instruction in a section of code for comparison with a corresponding section of the BTHB. For the purposes of this disclosure, the BTHB entries which include an instruction address can be collectively referred to as address-entries.

While the present invention has been described with reference to particular embodiments, it will be understood that the embodiments described above are illustrative and that the scope of the invention is not limited to these embodiments. Many variations, modifications, additions and improvements to the described embodiments are possible. These variations, modifications, additions and improvements are intended to be within the scope of the invention as detailed within the following claims.

What is claimed is:

1. A method for verifying trace data corresponding to a sequence of instructions, wherein said trace data includes a plurality of entries including one or more address entries and one or more bitmap entries, each bitmap entry corresponding to one or more conditional branches, the method comprising (a) scanning a last section of said trace data in reverse chronological order from a last address entry containing a last address to a prior address entry containing a prior address, wherein said last section comprises a last portion of said bitmap entries;

(b) identifying a first number of said conditional branches indicated by said last portion of said bitmap entries;

(c) scanning said sequence of instructions in execution order beginning at said prior address and ending at a last instruction corresponding to said last address entry;

(d) counting a second number of said conditional branches which are scanned in execution order between said prior address and said last instruction corresponding to said last address entry; and (e) verifying that said first number is equal to said second number, wherein said trace data is determined to be invalid if said first number is not equal to said second number.

2. The method of claim 1, further comprising repeating steps (a)–(e) for a prior section of said trace data.

3. The method of claim 1, wherein said last instruction corresponding to said last address entry is a last unconditional branch, the method further comprising comparing said last address to a target address of said last unconditional branch, and wherein if said last address and said target address are not equal, said trace data is determined to be invalid.

4. The method of claim 1 wherein each of said bitmap entries contains a bitmap, wherein each said bitmap contains one or more branch bits, wherein each branch bit is indicative of whether a corresponding one of said one or more conditional branches was taken and wherein said identifying a first number comprises counting said branch bits comprised within said last portion of said bitmap entries.

5. The method of claim 4 wherein said branch bits in one of said bitmaps are counted by locating a stop bit in said one of said bitmaps and determining how many higher order bits are in said one of said bitmaps.

6. The method of claim 5 wherein said stop bit is located by scanning said one of said bitmaps beginning with a lowest order bit and disregarding any 0-bits, said first 1-bit being said stop bit.

7. The method of claim 1 wherein said scanning said sequence of instructions comprises reading one of said sequence of instructions and:

(i) if said one of said sequence of instructions is a conditional branch, reading a corresponding bit in one of said bitmap entries and taking said conditional branch if indicated by said corresponding bit;

(ii) if said one of said sequence of instructions is an unconditional branch, reading a target address in a corresponding one of said unconditional branch entries and scanning to said target address;

(iii) if said one of said sequence of instructions is not a branch, scanning to a next instruction in program order; and repeating steps (i)–(iii).

8. A system, comprising:

(a) a branch trace history buffer configured to store a plurality of entries in response to execution of a plurality of instructions, one or more of said entries comprising bitmap entries, each said bitmap entry comprising a bitmap indicative of whether a series of conditional branches were taken, and one or more of said entries comprising address entries, each said address entry comprising an address of one of said plurality of instructions;

(b) an instruction storage for storing said plurality of instructions; and (c) a microprocessor coupled to said branch trace history buffer and said instruction storage and configured to:

(i) scan said entries in reverse chronological order beginning with a most recent entry;

(ii) locate a series of one or more bitmap entries between said most recent entry and a preceding address entry;

(iii) count a number of conditional branches in execution order between a first instruction corresponding to said preceding address entry and a second instruction corresponding to said most recent entry;

(iv) count a number of bits corresponding to conditional branches in said series of one or more bitmap entries; and (v) compare said number of conditional branches to said number of bits corresponding to conditional branches;

wherein said data in said branch trace history buffer is determined to be invalid if said number of conditional branches is not equal to said number of bits corresponding to conditional branches.

9. The system of claim 8 wherein said microprocessor is configured to repeat steps (i)–(v) beginning with said preceding address entry.

10. The system of claim 8 wherein said microprocessor is further configured to locate one or more unconditional branches between said first instruction and said second instruction, determine a target address for each of said one or more unconditional branches and compare said target address with an address in a corresponding address entry, wherein said data in said branch trace history buffer is determined to be invalid if said target address does not match said address in said corresponding address entry.

11. The system of claim 8 wherein said microprocessor is further configured to count said number of conditional branches in execution order by:

(1) starting with said first instruction and examining each subsequent instruction in program order until one of said conditional branches is located;

(2) counting said one of said conditional branches;

(3) examining a corresponding bit in a corresponding one of said bitmap entries to determine whether said one of said conditional branches was taken;

(4) continuing with a target instruction if said corresponding bit is set and continuing with a subsequent instruction in program order if said corresponding bit is not set; and repeating steps (1)–(4) until said second instruction is reached.

12. The system of claim 11 wherein said microprocessor is further configured to count said number of bits corresponding to said conditional branches by:

(a) determining a number N of consecutive bitmaps within said series of one or more bitmap entries;

(b) locating a stop bit in a last one of said consecutive bitmaps;

(c) determining a number of bits in said last bitmap corresponding to said conditional branches based on a location of said stop bit; and (d) adding said number of bits in said last bitmap corresponding to said conditional branches to a product of (N−1) and a bit capacity of said bitmaps.

13. The system of claim 12 wherein said microprocessor is further configured to determine said number of bits in said last bitmap corresponding to said conditional branches by, beginning at a first end, examining subsequent bits of said last bitmap until a first set bit is located, wherein said first set bit is said stop bit, and counting each bit subsequent to said stop bit.

14. A method of verifying trace data, wherein the trace data corresponds to a sequence of instructions and comprises a plurality of entries including one or more address entries and one or more bitmap entries, wherein each bitmap entry corresponds to one or more conditional branches, the method comprising:

locating an initial entry within the trace data;

locating an initial instruction within the sequence of instructions, wherein the initial instruction corresponds to the initial entry;

determining a type of trace event recorded in a next entry immediately following the initial entry within the trace data;

scanning the sequence of instructions in program order from the initial instruction to a subsequent instruction corresponding to the type of trace event recorded in the next entry; and if during said scanning, one or more intervening instructions are scanned that would have generated a trace event, determining that the trace data is invalid.

15. The method as recited in claim 14, wherein the type of trace event recorded in the next entry is an asynchronous event, and wherein said scanning comprises scanning to a target specified in the next entry.

16. The method as recited in claim 15, further comprising repeating said locating the initial entry, said locating the initial instruction, said determining, and said scanning, wherein the initial entry for said repeating is the next entry, and wherein the initial instruction for said repeating is the target specified in the next entry.

17. The method as recited in claim 14, wherein the type of trace event recorded in the next entry is an unconditional branch event, and wherein said scanning comprises scanning to an unconditional branch instruction.

18. The method as recited in claim 17, further comprising repeating said locating the initial entry, said locating the initial instruction, said determining, and said scanning, wherein the initial entry for said repeating is the next entry, and wherein the initial instruction for said repeating is the target specified in the next entry.

19. The method as recited in claim 14, wherein the type of trace event recorded in the next entry is a conditional branch event, and wherein said scanning comprises scanning to a conditional branch instruction.

20. The method as recited in claim 19, further comprising determining whether a conditional branch indicated by the conditional branch instruction was taken, wherein said determining is based on a value of a corresponding bit in a bitmap comprised within the next entry.

21. The method as recited in claim 20, wherein if the bitmap comprised within the next entry contains additional bits corresponding to additional conditional branches, the method further comprises repeating said scanning, and wherein the initial instruction for said repeating is:

a target of the conditional branch instruction if the conditional branch was taken; or a next instruction in program order if the conditional branch was not taken.

22. The method as recited in claim 20, wherein if the bitmap comprised within the next entry does not contain additional bits corresponding to additional conditional branches, the method further comprises repeating said locating the initial entry, said locating the initial instruction, said determining, and said scanning, wherein the initial entry for said repeating is the next entry, and wherein the initial instruction for said repeating is:

a target of the conditional branch instruction if the conditional branch was taken; or a next instruction in program order if the conditional branch was not taken.

\* \* \* \* \*